US012673766B2

(12) United States Patent
Wittmer

(10) Patent No.: US 12,673,766 B2
(45) Date of Patent: Jul. 7, 2026

(54) ROTORCRAFT SYSTEM FOR COMMAND MODE TRANSITIONS

(71) Applicant: Textron Innovations Inc., Providence, RI (US)

(72) Inventor: Kenneth Stephen Wittmer, Sandy Hook, CT (US)

(73) Assignee: Textron Innovations Inc., Providence, RI (US)

( * ) Notice: Subject to any disclaimer, the term of this patent is extended or adjusted under 35 U.S.C. 154(b) by 168 days.

(21) Appl. No.: 18/425,183

(22) Filed: Jan. 29, 2024

(65) Prior Publication Data

US 2025/0242908 A1 Jul. 31, 2025

(51) Int. Cl.
*B64C 19/02* (2006.01)
*B64C 27/00* (2006.01)
*B64C 27/57* (2006.01)

(52) U.S. Cl.
CPC ............ *B64C 19/02* (2013.01); *B64C 27/008* (2013.01); *B64C 27/57* (2013.01)

(58) Field of Classification Search
CPC ........ B64C 19/02; B64C 27/008; B64C 27/57
See application file for complete search history.

(56) References Cited

U.S. PATENT DOCUMENTS

| | | | | |
|---|---|---|---|---|
| 5,799,901 A | * | 9/1998 | Osder | G05D 1/0858 416/114 |
| 6,128,556 A | * | 10/2000 | Bailey | B64G 1/286 701/4 |
| 7,101,246 B1 | * | 9/2006 | Dammar | B64C 27/00 244/17.11 |
| 7,343,232 B2 | * | 3/2008 | Duggan | B64C 19/00 701/13 |
| 8,346,410 B2 | * | 1/2013 | Seo | B64G 1/26 701/13 |
| 8,473,124 B2 | * | 6/2013 | Shue | G05D 1/101 701/4 |
| 8,882,024 B1 | * | 11/2014 | McCollough | B64C 27/82 244/17.19 |
| 9,235,217 B2 | * | 1/2016 | Barnes | G05D 1/0858 |
| 9,908,616 B1 | * | 3/2018 | Horn | B64D 31/06 |
| 10,040,542 B1 | * | 8/2018 | Gillett | B64C 27/04 |
| 10,641,184 B2 | * | 5/2020 | Wulff | F02C 9/28 |
| 10,654,561 B2 | * | 5/2020 | Worsham | B64C 27/82 |
| 10,691,140 B2 | * | 6/2020 | Kim | B64C 13/503 |
| 11,067,981 B2 | * | 7/2021 | Kim | B64C 13/503 |
| 2007/0030174 A1 | * | 2/2007 | Randazzo | G05D 1/0858 340/979 |

(Continued)

*Primary Examiner* — Mussa A Shaawat
(74) *Attorney, Agent, or Firm* — Slater Matsil, LLP

(57) ABSTRACT

A method includes determining an angular rate of a rotorcraft based on a pilot input of the rotorcraft; determining an attitude reference for the rotorcraft based on the angular rate, the determining including determining an attitude difference from a trim attitude of the rotorcraft; determining a linear acceleration error for the rotorcraft; determining a trim attitude of the rotorcraft, wherein the trim attitude is based on the linear acceleration error; and summing the attitude difference and the trim attitude to generate the attitude reference; determining a flight command for the rotorcraft based on the attitude reference; and controlling flight control elements of the rotorcraft based on the flight command.

20 Claims, 8 Drawing Sheets

(56)  References Cited

U.S. PATENT DOCUMENTS

| | | | | |
|---|---|---|---|---|
| 2010/0135800 | A1* | 6/2010 | Melius | F03D 7/02 |
| | | | | 416/44 |
| 2012/0130565 | A1* | 5/2012 | Shirota | B64C 13/345 |
| | | | | 701/3 |
| 2012/0253561 | A1* | 10/2012 | Ellis | G05D 1/0858 |
| | | | | 701/3 |
| 2012/0318929 | A1* | 12/2012 | Golling | B64D 39/00 |
| | | | | 244/203 |
| 2013/0138270 | A1* | 5/2013 | Christensen | G05D 1/102 |
| | | | | 701/3 |
| 2016/0280369 | A1* | 9/2016 | Pounds | B64U 50/13 |
| 2017/0349274 | A1* | 12/2017 | Fenny | B64C 27/82 |
| 2018/0061250 | A1* | 3/2018 | Moran | B64D 43/00 |
| 2018/0265190 | A1* | 9/2018 | Fortenbaugh | B64C 13/503 |
| 2019/0155282 | A1* | 5/2019 | Kim | B64C 13/503 |
| 2019/0202546 | A1* | 7/2019 | Mahboubi | G05D 1/654 |
| 2019/0225349 | A1* | 7/2019 | Sinusas | B64D 47/00 |
| 2019/0265729 | A1* | 8/2019 | Gillett | B64C 27/04 |
| 2019/0369647 | A1* | 12/2019 | Gillett | G01P 7/00 |
| 2020/0023955 | A1* | 1/2020 | Worsham, II | B64C 27/57 |
| 2020/0023958 | A1* | 1/2020 | Acee | B64D 27/357 |

* cited by examiner

ROTORCRAFT SYSTEM FOR COMMAND MODE TRANSITIONS

TECHNICAL FIELD

The present invention relates generally to a system and method for a flight control, and, in particular embodiments, to a system and method for command mode transition smoothing for a rotorcraft.

BACKGROUND

Fly-by-wire systems in aircraft, as opposed to mechanically controlled systems, use electronic signals to control the flight surfaces and engines in the aircraft. For example, instead of having the pilot controls mechanically linked to the control surfaces via a hydraulic system, the pilot controls are electronically linked to a flight computer, which, in turn, controls flight surface actuators via electronic signals. By further interfacing the flight computer to aircraft sensors, sophisticated control algorithms may be used to provide autopilot functionality, as well as to stabilize and control the aircraft.

While fly-by-wire systems have become commonplace in commercial and civilian fixed wing aircraft, their adoption among rotorcraft, such as helicopters, has been much slower due, in part, to the increased complexity of controlling and stabilizing a rotorcraft. However, by adopting fly-by-wire systems in helicopters, safer operation may be achieved in difficult flight environments such as low speed, low altitude, degraded visual environments and inclement weather. Another area in which fly-by-wire systems may benefit rotorcraft is in the reduction in pilot workload. By providing automated features such as stabilization in response to wind, control axis decoupling, position hold and heading hold functionality, the pilot is freed up to focus on the flight environment.

One challenge in the design of fly-by-wire systems for rotorcraft is transitioning between different modes of operation that utilize different control laws or algorithms. In some circumstances, the change in control algorithm may result in a physical transient during operation of the rotorcraft that might be physically discernable as a bump or jolt by the pilot or passengers.

SUMMARY

In accordance with an embodiment, a method of operating a rotorcraft includes determining an attitude reference for the rotorcraft. The attitude reference is based on an angular rate of the rotorcraft, which may be determined from a pilot input. Determining the attitude reference includes determining an attitude difference from a trim attitude, determining a linear acceleration error, and determining a trim attitude based on the linear acceleration error. Summing the attitude difference and the trim attitude generates the attitude reference. Flight control elements of the rotorcraft are controlled based on the attitude reference.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
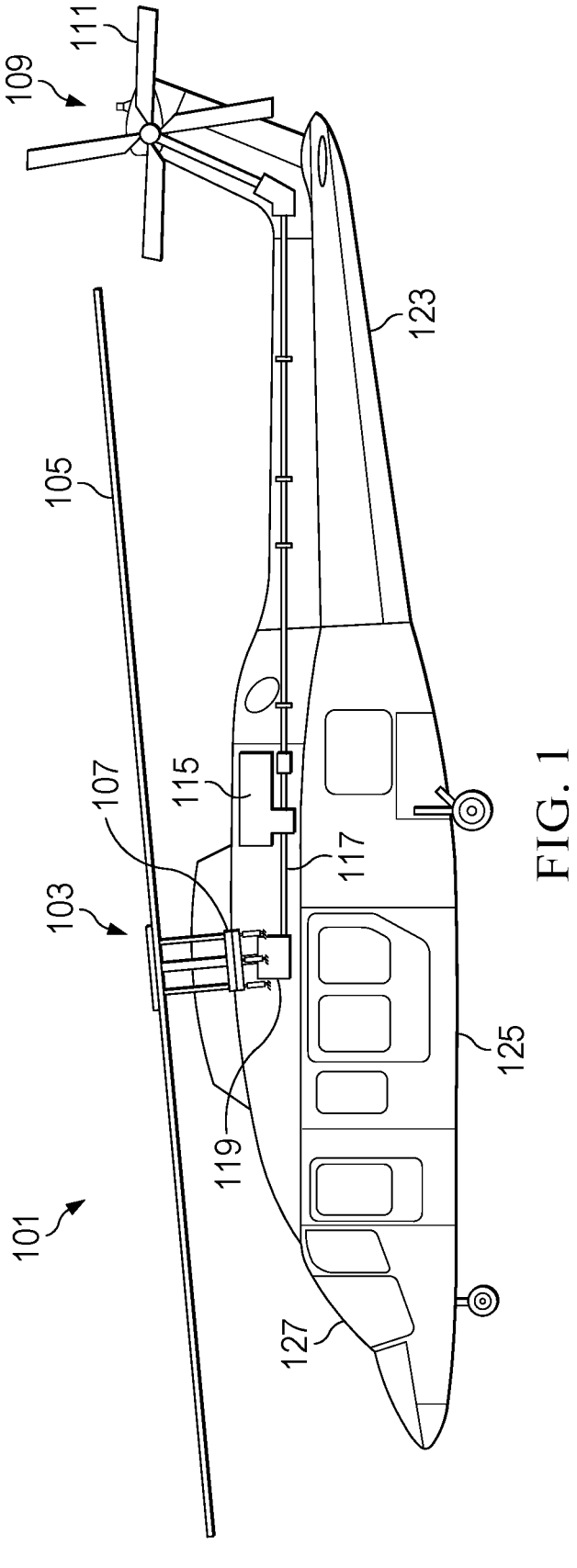
FIG. 1 illustrates a rotorcraft, in accordance with some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective causes increased power to the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW controlled flight parameters, and which reflect a collective or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system use the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

Embodiments of the present disclosure will be described with respect to embodiments in a specific context, namely a system and method for smoothing transitions between angular-based command modes and linear-based command modes in a rotorcraft. Embodiments of the present disclosure may also be applied to other command mode transitions in the operation and control of a rotorcraft. For example, embodiments described herein allow for smooth transitions between angular-based command modes such as Rate Command/Attitude Hold (RCAH) or Attitude Command/Attitude Hold (ACAH) and/or linear-based command modes such as Acceleration Command/Velocity Hold (ACVH) or Translational Rate Command (TRC).

The embodiments described herein describe an easily-reconfigurable integrated command model for seamless transitions between command modes that is applicable throughout the entire operational envelope of a rotorcraft. In some embodiments, the smooth command mode transitions are enabled by incorporating linear command models within an angular command structure. The embodiments described herein allow for safe and smooth transitions between command modes even during aggressive maneuvers. Embodiments herein also allow for command mode transitions without a delay, reset, detent requirement, or other procedural limits such as pilot-imposed or software-imposed procedural limits. For example, in some cases, the operational envelopes of supported command modes do not need to be limited by possible hazards associated with transitions between the various command modes.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 11 is collectively changed in order to vary thrust of the anti-torque system, providing directional control of the rotorcraft 101. The pitch of the tail rotor blades 11 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle (e.g., a human-piloted drone), in which case cockpit 127 could be eliminated entirely in order to save space and cost.

Figure 2:
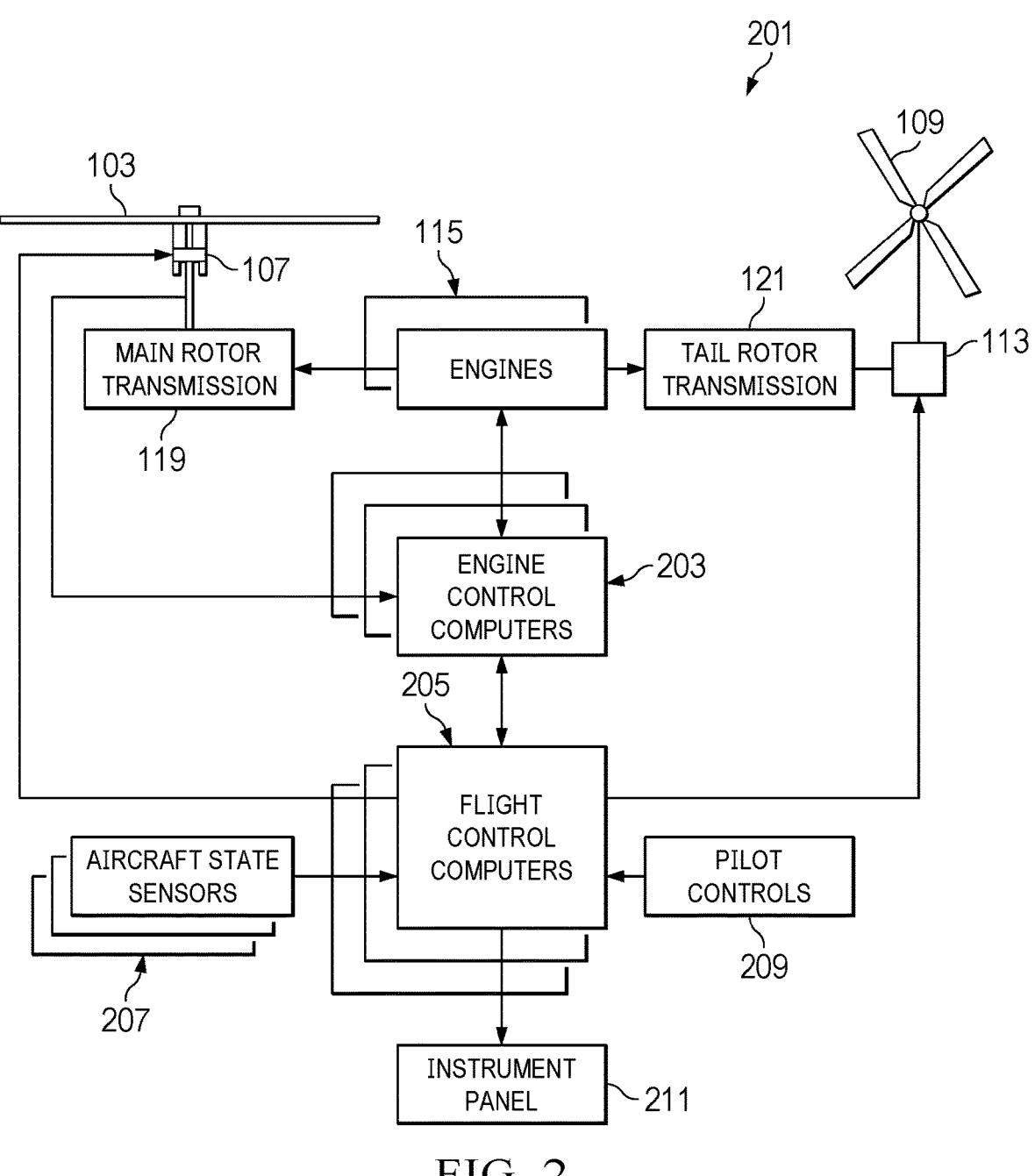
FIG. 2 illustrates a flight control system of a rotorcraft, in accordance with some embodiments.

FIG. 2 illustrates a fly-by-wire flight control system 201 for a rotorcraft according to some embodiments. A pilot may manipulate one or more pilot controls 209 in order to control flight of the rotorcraft. The pilot controls 209 may include manual controls such as a cyclic stick, a collective stick, a joystick, pedals, or the like. Inputs provided by the pilot to the pilot controls 209 may be transmitted mechanically and/or electronically (e.g., via the FBW flight control system) to flight control devices by the flight control system 201. Flight control devices may represent devices operable to change the flight characteristics of the rotorcraft. For example, flight control devices on the rotorcraft may include mechanical and/or electrical systems operable to change the positions or angle of attack of the main rotor blades 105 and the tail rotor blades 11 or to change the power output of the engines 115. Flight control devices also may include the swashplate 107, the tail rotor actuator 113, or systems operable to control the engines 115. The flight control system 201 may adjust the flight control devices independently of the flight crew in order to stabilize the rotorcraft, reduce workload of the flight crew, and the like. The flight control system 201 includes engine control computers (EC-CUs) 203, flight control computers (FCCs) 205, and aircraft sensors 207, which collectively adjust the flight control devices.

In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, actuators for the swashplate 107, or other flight control devices. Further, the FCCs 205 are configured to receive input commands from the pilot controls 209 through sensors associated with the pilot controls 209. The input commands may be generated, for example, by measuring the positions of the pilot controls 209 using the sensors. The FCCs 205 may also control tactile cueing commands to the pilot controls 209 or may control the display of information, for example, on the instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such a measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions, and the like. For example, the aircraft sensors 207 may include sensors for measuring airspeed, altitude, attitude, position, orientation, temperature, airspeed, vertical speed, and the like. Other sensors 207 could include sensors relying upon data or signals originating external to the rotorcraft, such as a global positioning system (GPS) sensor, a VHF Omnidirectional Range sensor, Instrument Landing System (ILS), and the like.

In some embodiments, a control of the pilot controls 209 may have one or more sensors that measure the position or other input elements of that control. In some embodiments, the control is free of a trim motor or actuator, and may have a mechanical return element that centers the control when the pilot releases the control. In this manner, in some embodiments, the control may be a "unique-trim" control in which the output of the control corresponds to a displacement of the control from the centered (e.g., "unique") position. In such embodiments, the centered position of the control represents the FBW command model in its "hold" condition.

For example, in some embodiments, the pilot controls 209 may include a unique-trim cyclic control, such as a cyclic control stick or the like. In some embodiments, the cyclic control stick may be a single control stick that moves along two axes and permits a pilot to control pitch (i.e., the vertical angle of the nose of the rotorcraft) and roll (i.e., the side-to-side angle of the rotorcraft). The cyclic control stick may be part of a cyclic control assembly that includes sensors which measure the position of the cyclic control stick. In some embodiments, the cyclic control assembly may include multiple cyclic position sensors that measure roll and pitch separately. The sensors may communicate signals indicating the measured roll and/or pitch to the FCCs 205.

Figure 3:
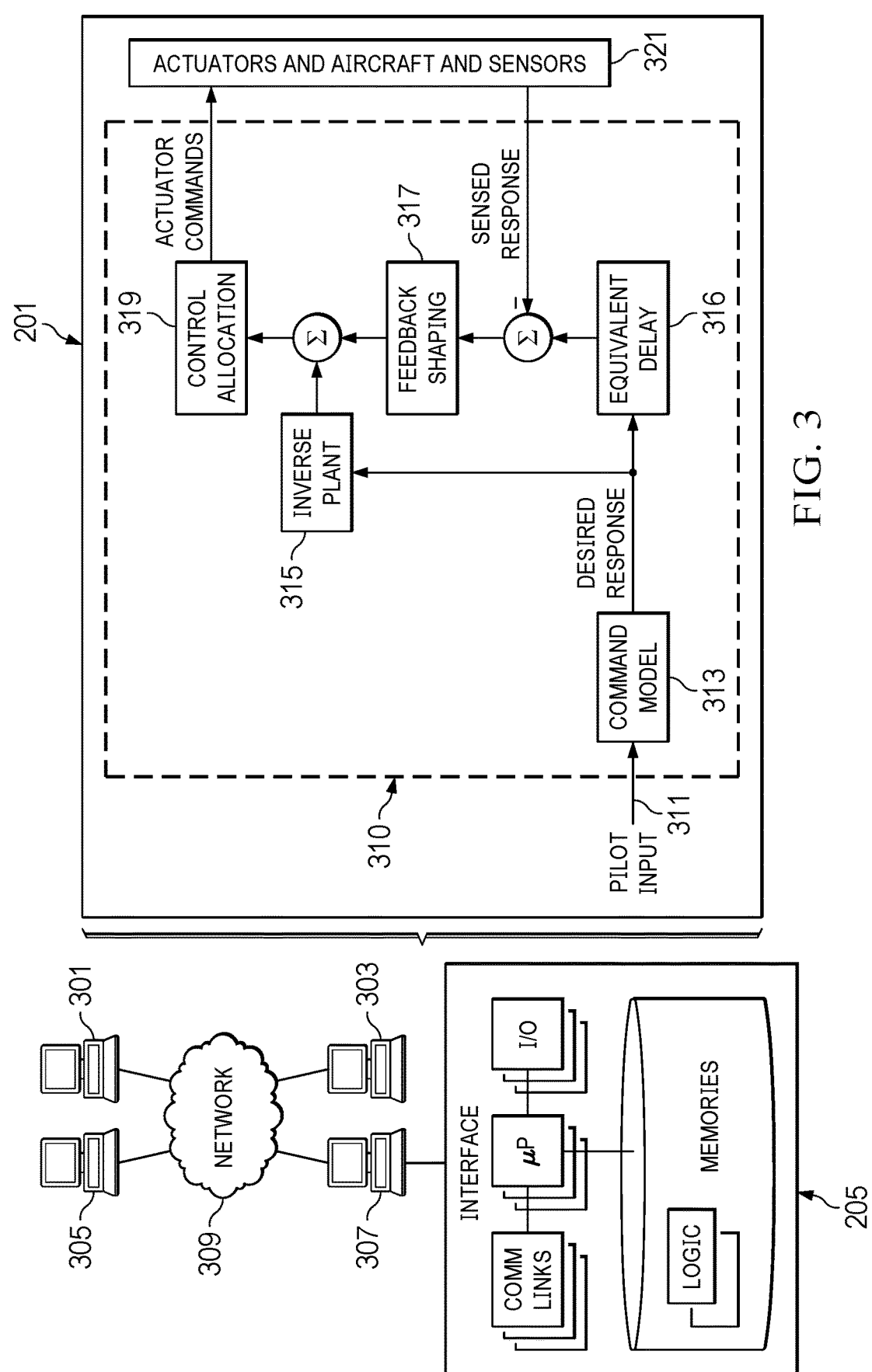
FIG. 3 illustrates a block diagram of a flight control system, in accordance with some embodiments.

Moving now to the operational aspects of flight control system 201, FIG. 3 illustrates, in a highly schematic fashion, a manner in which flight control system 201 may implement FBW functions within a rotorcraft. FIG. 3 representatively illustrates a flight controller 310 of the flight control system 201, in accordance with some embodiments. In particular, the control system architecture of the flight controller 310 is shown in FIG. 3. The flight controller 310 receives pilot commands (e.g., pilot input 311) and generates corresponding flight commands for the rotorcraft, according to an embodiment. The flight controller 310 interfaces with and controls aircraft equipment 321, which represents various components (e.g., engines 115), actuators (e.g., swashplate 107, tail rotor actuator 113, etc.), sensors (e.g., sensors 207), and the physical body of the rotorcraft. In some embodiments, the flight controller 310 may be implemented at least partially by FCCs 205. As shown in FIG. 3, however, all, some, or none of the components (301, 303, 305, 307) of the flight control system 201 could be located external or remote from the rotorcraft and communicate to on-board devices through a network connection 309. The flight controller 310 shown in FIG. 3 is a simplified example, and an embodiment flight controller 400 is described in greater detail below.

Still referring to FIG. 3, the flight controller 310 receives pilot input 311, such as signals received from pilot controls 209. Using a command model 313, the flight controller 310 processes the pilot input 311 (e.g., applies appropriate gains or the like) to generate a desired response for the rotorcraft. The desired response is inputted into an inverse plant model 315 to generate a feed-forward response. A sensed response representing the state of the rotorcraft is received from rotorcraft sensors and compared with the desired response to generate a feedback error signal. The desired response may first be given an appropriate delay, represented by Equivalent Delay block 316 (e.g., "delay block 316"). Appropriate gains or other processing may be applied to the feedback error signal at Feedback Shaping block 317, and then the feedback error signal is combined with the feedback error signal to generate a total command signal (e.g., flight commands). The total command signal is processed to generate appropriate actuator commands, represented by the Control Allocation block 319. For example, the Control Allocation block 319 may apportion the actuator commands in such a way as to minimize undesirable coupling between axes. The actuator commands are then communicated to the appropriate aircraft equipment 321 to control the flight of the rotorcraft. In this manner, the flight controller 310 may control the flight of the rotorcraft based on the pilot input 311. The flight controller 310 shown in FIG. 3 is an example, and other configurations of control system architecture are possible.

Figure 4:
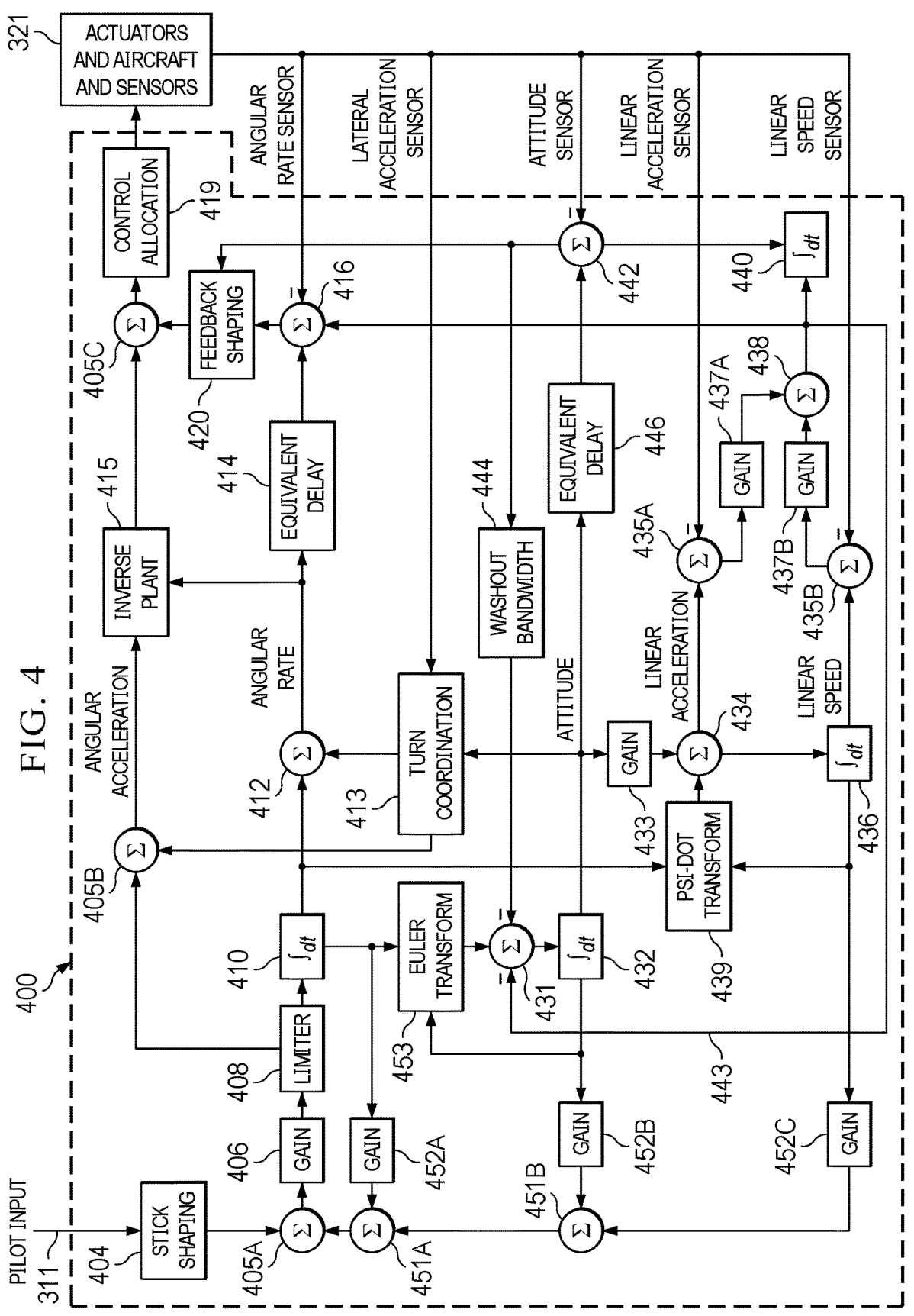
FIG. 4 illustrates a block diagram of a flight controller of a flight control system, in accordance with some embodiments.
Figure 5:
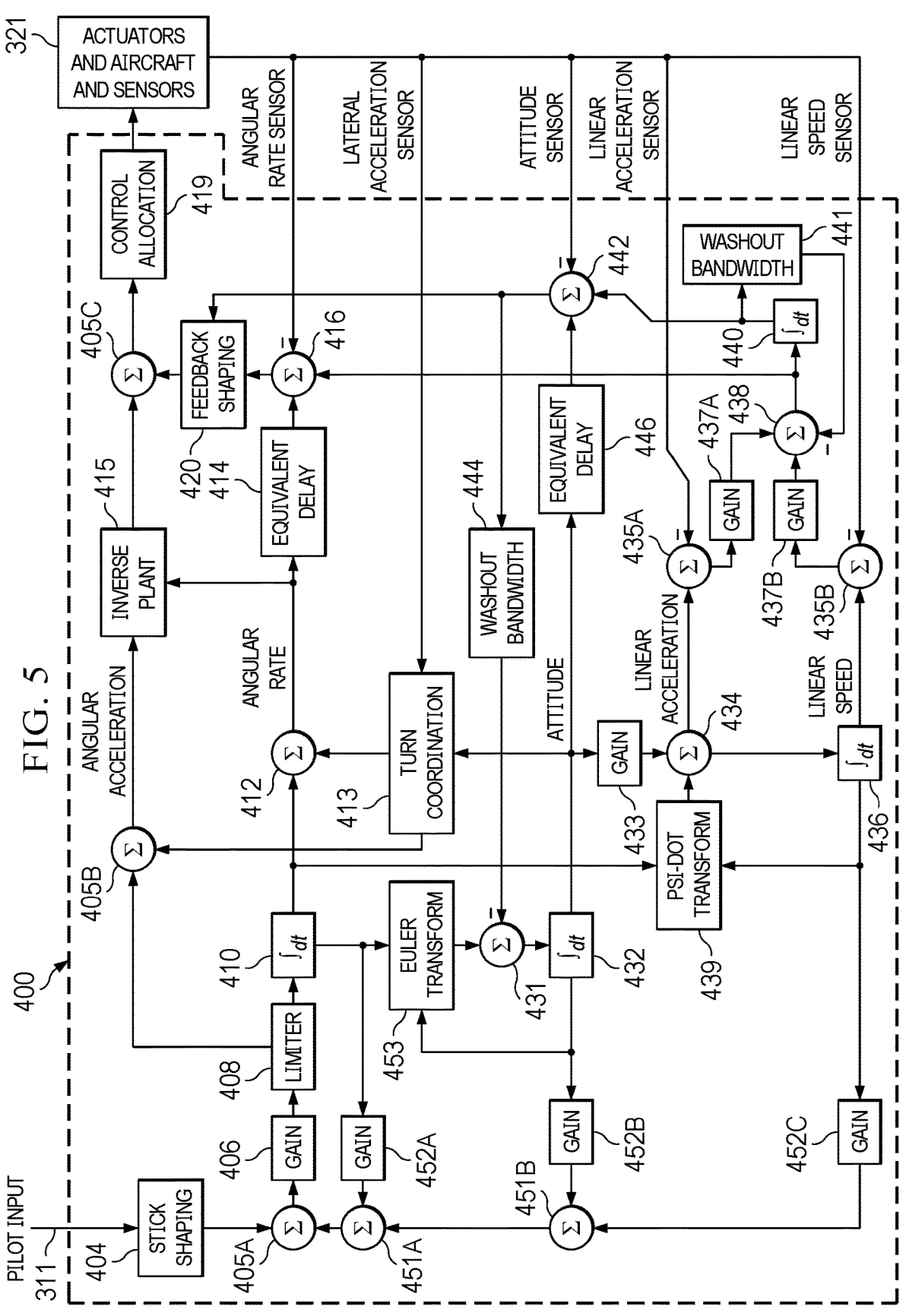
FIG. 5 illustrates a block diagram of a flight controller in a linear-based configuration, in accordance with some embodiments.
Figure 6:
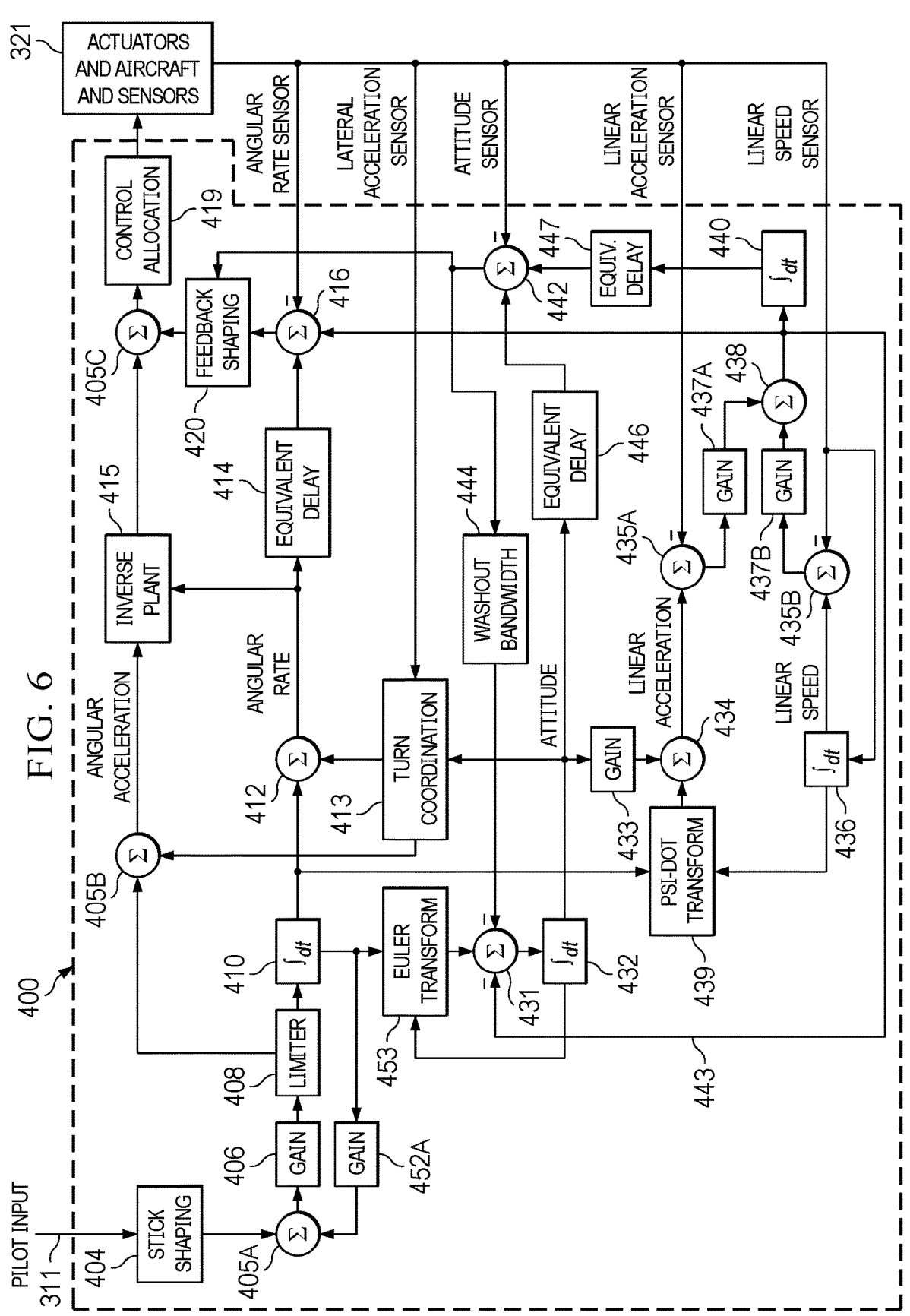
FIG. 6 illustrates a block diagram of a flight controller in an angular-based configuration, in accordance with some embodiments.
Figure 7:
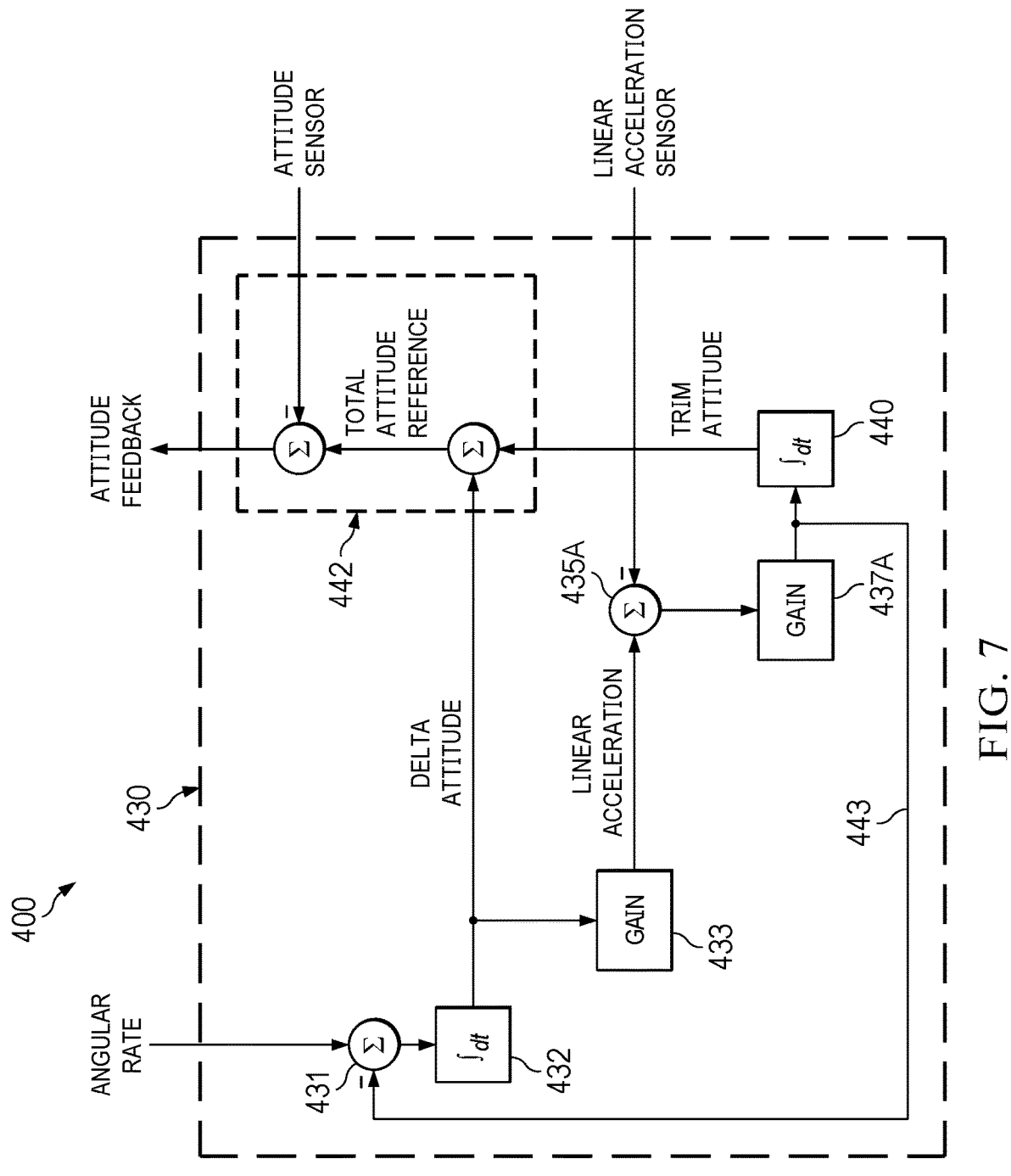
FIG. 7 illustrates a block diagram of an attitude command model, in accordance with some embodiments.

FIG. 4 illustrates a control system architecture of a flight controller 400 for a rotorcraft, in accordance with some embodiments of the present invention. FIG. 4 generally illustrates various blocks and signal paths of the flight controller 400 for explanatory purposes, and subsequent FIGS. 5-7 illustrate example configurations of the flight controller 400 for different command modes, described in greater detail below. The flight controller 400 may be implemented by flight control system 201, and may be implemented using a flight computer (e.g., FCCs 205) or other processing hardware. For example, the flight controller 310 described for FIG. 3 may be similar to the flight controller 400, in some embodiments. Similar to the flight controller 310 described for FIG. 3, the flight controller 400 receives pilot commands (e.g., pilot input 311) and utilizes a command model to generate corresponding flight commands for the rotorcraft (e.g., aircraft equipment 321). The command model of the flight controller 400 comprises various gains (e.g. gain blocks 406, 452A-C, 437A-B, etc.), blocks, and signal paths that may have different configurations or different parameters for each command mode of the rotorcraft. In other words, the configuration of the flight controller 400 may be changed during operation of the rotorcraft as the command mode of the rotorcraft changes. The various blocks and signal paths shown in the figures are examples, and other configurations of the control system architecture for flight controller 400 are possible.

The flight controller 400 may be implemented when the rotorcraft is in an angular-based command mode, (e.g., Rate Command/Attitude Hold (RCAH), Attitude Command/Attitude Hold (ACAH), or the like) or when the rotorcraft is in a linear-based command mode (e.g., Linear Acceleration Command/Velocity Hold (LACVH), Translational Rate Command (TRC), or the like). The configuration of the various gains, blocks, and signal paths of the flight controller 400 are based upon the selected command mode and particular command axis, and are changed appropriately as the rotorcraft transitions from one command mode to another command mode. The techniques described herein allow for smooth transitions between angular-based command modes and linear-based command modes.

The Control Allocation block 419 of the flight controller 400 may be similar to the Control Allocation block 319 described previously. For example, the Control Allocation block 419 receives flight commands generated within the flight controller 400 (e.g., from the summation block 405C) and apportions corresponding actuator commands in such a way as to minimize undesirable coupling between axes. In this manner, the Control Allocation block 419 may be a "decoupler," in some cases. In some cases, the Control Allocation block 419 may be considered a module or block that is separate from the flight controller 400. The aircraft equipment 321 receives the actuator commands generated by the Control Allocation block 419 and then sends corresponding signals to actuators of rotorcraft based on the actuator commands.

The sensors (e.g. sensors 207) of the aircraft equipment 321 also provide state feedback for the rotorcraft. For example, as shown in FIG. 4, the state feedback may include angular rate sensor feedback, lateral acceleration sensor feedback, attitude sensor feedback, linear acceleration sensor feedback, and/or linear speed sensor feedback. The flight controller 400 may use the state feedback to determine various state errors, for example.

The pilot input 311 represents commands received from the pilot controls 209 of the rotorcraft. For example, the pilot input 311 may correspond to the action of the pilot stick based on the current command mode of the rotorcraft. The flight controller 400 receives the pilot input 311 and provides appropriate flight commands to the rotorcraft based on a command model implemented by the flight controller 400. In some embodiments, the command model generates flight commands implemented by angular acceleration commands, for both angular-based and linear-based command modes. In other words, the pilot input 311 may be interpreted by the flight controller 400 as an angular acceleration flight command, with the characteristics and parameters of the interpretation being in accordance with the current command mode of the rotorcraft.

The pilot input 311 may be a signal inputted into a Stick Shaping block 404, which may apply gain, limiting, or otherwise process the pilot input 311, the particulars of which may depend on the pilot input 311 itself, the rotorcraft state, and/or the current command mode. The signal from the Stick Shaping block 404 may be inputted into a summation block 405A that sums (e.g., adds or subtracts) the signal and other signals from summation blocks 451A-B and gain blocks 452A-C to form feedback loops of the command model. The summed signal from the summation block 405A may be provided to the gain block 406 that applies a gain to the signal. The various gains of the gain blocks 406 and/or 452A-C of the command model may be configured according to the current command mode of the rotorcraft. In other words, the gains of the gain blocks 406 and/or 452A-C may be changed (e.g., reconfigured or reparameterized) when the rotorcraft transitions from one command mode to a different command mode.

The signal from the gain block 406 is inputted into the limiter 408. The limiter 408 may limit the value of the signal to a range, which may include a maximum positive value and/or negative value. In other words, for a pilot input 311 corresponding to an angular acceleration, the magnitude of the angular acceleration may be limited by the limiter 408, which can provide significant load alleviation and ensure rotorcraft safety. Because all command modes are implemented as angular acceleration commands in the embodiments described herein, limiting the angular acceleration using limiter 408 can provide improved safety and reduced loads for all command modes.

The angular acceleration signal from the Stick Shaping block 404 may also be inputted into a summation block 405B where it is summed (e.g., added or subtracted) to a signal from a Turn Coordination block 413. The Turn Coordination block 413 receives lateral acceleration feedback and attitude signals and processes them to facilitate turn coordination for angular acceleration and angular rate commands. The angular acceleration signal is then inputted into an Inverse Plant block 415, which generates a control signal based on an inverse plant model for the rotorcraft. The Inverse Plant block 415 generates the control signal at least partially from the angular acceleration signal corresponding to the pilot input 311, as described above. In summation block 405C, the control signal from the Inverse Plant block 415 is summed with a feedback signal (from feedback shaping block 420) to generate the flight commands provided to the Control Allocation block 419. The Inverse Plant block 315 of FIG. 3 may be similar to the Inverse Plant block 415, in some embodiments.

The angular acceleration signal from the limiter 408 may also be sent to an integrator 410 to generate an angular rate signal corresponding to the pilot input 311. The integrator 410 may be, for example, an accumulator or the like. The angular rate signal may be summed with a turn coordination signal at summation block 412, and then the angular rate signal may be provided to the Inverse Plant block 415. The Inverse Plant block 415 may generate its control signal at least partially from the angular rate signal corresponding to the pilot input 311. The angular rate signal may also be provided to a delay block 414 then to summation block 416 where the signal and an angular rate sensor signal are subtracted to generate an angular rate error signal, which is provided to the feedback shaping block 420. The angular rate signal is also provided to the gain block 452A and then the signal is provided to summation block 451A to form a feedback loop of the command model, as mentioned previously.

In some embodiments, the angular rate signal generated by the integrator 410 is provided to a Euler Transform block 453. The Euler Transform block 453 transforms the angular rate signal from an angular rate on a body-axis to an angular rate on a Euler-axis (e.g., an "Euler rate"). In some embodiments, the Euler Transform block 453 is configured to only perform the Euler-axis transform when the attitude is above certain angle thresholds.

The Euler rates from the Euler Transform block 453 are then used to determine an attitude reference, a linear acceleration reference, and/or a linear speed reference, which may be used to determine part of the feedback signal that is combined with the control signal from the Inverse Plant block 415 (e.g., at summation block 405C). The Euler rate signal is provided to a summation block 431 by the Euler Transform block 453. The summation block 431 also allows the linear acceleration feedback to be subtracted (provided by path 443) when in angular-based command modes, described in greater detail below.

The signal from the summation block 431 is provided to the attitude integrator 432 to generate an attitude reference signal. The attitude reference signal may be provided to a gain block 452B and then to summation block 451B as part of a feedback loop for the command model. The attitude reference signal may be provided to the Turn Coordination block 413, in some embodiments. The attitude reference signal is provided to delay block 446 and then to summation block 442, within which the attitude reference signal and the attitude sensor signal are subtracted as part of generating an attitude error signal, which is provided to the Feedback Shaping block 420 as part of a feedback loop. The attitude error signal is also provided to a Washout Bandwidth block 444 and then subtracted at the summation block 431 as part of a filter loop.

The attitude reference signal is also provided to a gain block 433, which applies gains to the attitude reference signal to generate a linear acceleration signal. In some embodiments, a signal from a Psi-dot Transform block 439 is combined with the output of the gain block 322 at summation block 434 to generate a linear acceleration reference signal. The Psi-dot Transform block 439 generates linear acceleration commands to compensate for the commanded heading rate and to preserve the rotorcraft's ground track. The linear acceleration reference signal and the linear acceleration sensor signal are subtracted by the summation block 435A to generate a linear acceleration error signal.

The linear acceleration reference signal from the summation block 434 is integrated at integrator 436 to generate a linear speed reference signal (e.g., a linear velocity signal).

The linear speed reference signal may be provided to gain block 452C and then to summation block 451B as part of a command model feedback loop. The linear speed reference signal and the linear speed sensor signal are subtracted by the summation block 435B to generate a linear speed error signal.

The linear acceleration error signal and the linear speed error signal may each have a gain applied at gain blocks 437A and 437B, respectively, and then the signals are combined at summation block 438 to generate a linear acceleration feedback signal. In some angular-based command modes, the linear speed error signal is not summed with the linear acceleration error signal, described in greater detail below. Further, in some angular-based command modes, the linear acceleration feedback signal is subtracted (via path 443) at the summation block 431, described in greater detail below. The linear acceleration feedback signal may also be provided to summation block 416 to contribute to the total feedback signal received by Feedback Shaping block 420.

In some cases, the linear acceleration feedback signal is provided to trim integrator 440 to generate a portion of the total attitude reference that is associated with trim (e.g., associated with zero acceleration). Thus, the total attitude reference at the summation block 442 is a combination of the attitude reference signal from delay block 446 and the trim attitude reference from trim integrator 440. In this manner, rather than using a single integrator to generate an attitude reference, the flight controller 400 as described herein divides the total attitude reference into a portion corresponding to the delta attitude from trim (e.g., the difference between the attitude command and the trim attitude) and a portion of the attitude reference corresponding to the trim attitude. The delta attitude from trim is generated by the integrator 432, and the trim attitude is generated by the trim integrator 440 within the linear acceleration feedback path. The delta attitude and the trim attitude are summed together at summation block 442 to generate the total attitude reference. Accordingly, the trim integrator 440 is active in both angular-based command modes and linear-based command modes, but the linear acceleration feedback signal is subtracted from the attitude reference signal at summation block 431 (via path 443) in angular-based command modes to remove contributions from linear acceleration to the total attitude reference.

In accordance with some embodiments of the present disclosure, the command model of the flight controller 400 includes a linear command model that is incorporated into an attitude command model. The linear command model within the attitude command model includes signal paths for linear acceleration feedback and linear speed feedback (e.g., linear velocity feedback). For example, the total attitude reference may include linear commands implemented as attitude commands when the rotorcraft is in linear-based command modes. The flight controller 400 described herein operates the linear command model for all command modes, including both angular-based command modes and linear-based command modes. For example, the linear acceleration feedback path remains active even in angular-based command modes to drive the trim integrator 440. In some embodiments, because the linear command model is active even in angular-based command modes, the rotorcraft's command mode may be switched from an angular-based command mode to a linear-based command mode using a simple gain/path reconfiguration, with a well-regulated transition. This can result in smoother transitions between command modes, which allows for an improved and safer pilot experience.

FIG. 5 illustrates a configuration of the flight controller 400 during a linear-based command mode, in accordance with some embodiments. For example, the configuration of flight controller 400 shown in FIG. 5 may be used for linear-based command modes such as Linear Acceleration Command/Velocity Hold ("LACVH" or "ACVH"), Translational Rate Command ("TRC"), or the like. The configuration of FIG. 5 may be implemented by the flight controller 400 of FIG. 4, with gains, blocks, and/or signal paths configured appropriately for the particular linear-based command mode. For example, in the linear-based configuration of FIG. 5, the path 443 is not present (e.g., is deactivated), and the trim attitude signal from the trim integrator 440 is provided to a washout filter block 441 and then to the summation block 442. In some embodiments, the various gains of the gain blocks 406, 452A-C, 433, and/or 437A-B of the linear-based configuration may be reparameterized to generate appropriate angular acceleration commands that correspond to the designated linear-based command mode. The command models described below (e.g., Equations (1) and (2)) are pitch axis command models presented herein as examples. Other command models for pitch, roll, and/or yaw axes in a linear-based commend mode are possible.

In some embodiments, the linear speed command (e.g., linear speed reference) is assumed to be the integration of the linear acceleration command (e.g., linear acceleration reference), and accordingly a linear speed signal is generated by providing a linear acceleration signal to the integrator 436, as described previously. In some embodiments, the trim attitude is determined using outer-loop integral feedback of linear acceleration and linear speed, implemented by trim integrator 440. In some embodiments, when the command mode of the rotorcraft is transitioned from angular-based to linear-based, the initial linear speed at the transition is taken to be the linear speed sensed at the transition.

In some embodiments, an LACVH command mode is implemented by the flight controller 400 using a linear acceleration command model that provides a linear acceleration command proportional to the delta attitude command (e.g., the attitude reference generated by integrator 432). For example, in some embodiments, the linear acceleration command may be determined by Equation (1):

$$Ax_{cmd} = g\,\theta_{cmd}. \tag{1}$$

In Equation (1), $Ax_{cmd}$ represents a linear acceleration command, g is the acceleration due to gravity, and $\theta_{cmd}$ represents a pitch attitude command. As described previously, the gains of the gain blocks 406, 452A-C, 433, and/or 437A-B may be selected to provide the appropriate command model for the LACVH command mode. The flight controller 402 described herein allows for a LACVH command mode to be implemented as a linear-based flight controller configuration within the existing flight controller 400 and without the need of a separate controller or a separate command model. This can allow for a smooth transition to the LACVH command mode or away from the LACVH command mode to be made anywhere within the flight operational envelope.

In some embodiments, a TRC command mode is implemented by the flight controller 400 using a third-order command model based on a pitch acceleration command.

For example, in some embodiments, the translational rate command may be determined by Equation (2):

$$\dot{q}_{cmd} =$$
$$X_b \frac{u_{max}\omega_u}{g}\omega_{AC}^2 - \frac{\dot{q}_{cmd}}{s}\left(2\zeta_{AC} + \frac{\omega_u}{\omega_{AC}} + \frac{\omega_{AC} + 2\zeta_{AC}\omega_u}{s} + \frac{\omega_{AC}\omega_u}{s^2}\right)\omega_{AC}. \tag{2}$$

In Equation (2), $\dot{q}_{cmd}$ represents a pitch acceleration command, $X_b$ represents a pilot longitudinal input, $u_{max}$ represents a maximum translational rate command, $\omega_u$ represents a translational rate command bandwidth, $\omega_{AC}$ represents the attitude command (e.g., translational acceleration) natural frequency, and $\zeta_{AC}$ represents a damping ratio. Determining the translational rate command using Equation (2) allows for the pitch acceleration and pitch rate to be limited, which can reduce loads on the rotorcraft and enhance safety. The translation rate command described above also can allow for an inverse plant to be implemented (e.g., at Inverse Planet block 415) without including additional lag dynamics. The flight controller 400 described herein allows for a TRC command mode to be implemented as a linear-based flight controller configuration within the existing flight controller 400 and without the need of a separate controller or a separate command model. This can allow for a smooth transition to the TRC command mode or away from the TRC command mode to be made anywhere within the flight operational envelope.

FIG. 6 illustrates a configuration of the flight controller 400 during an angular-based command mode, in accordance with some embodiments. For example, the configuration of flight controller 400 shown in FIG. 6 may be used for an angular rate command mode, such as a Rate Command/Attitude Hold ("RCAH") command mode. The configuration of FIG. 6 may be implemented by the flight controller 400 of FIG. 4, with gains, blocks, and/or signal paths configured appropriately for the particular angular-based command mode. For example, the various gains of the gain blocks 406, 452A-C, 433, and/or 437A of the flight controller 400 may be reparameterized to generate the appropriate angular acceleration commands that correspond to the designated angular-based command mode (e.g., RCAH). Additionally, in the angular-based configuration of FIG. 6, the path 443 is present (e.g., active), and the trim attitude signal from the trim integrator 440 is provided to delay block 447 and then to the summation block 442. Further, as shown in FIG. 6, the attitude and linear speed may not be fed back into the summation block 405A, and thus the gains 452B-C and their associated paths (see FIGS. 4-5) are not active.

For angular-based command modes in which linear commands do not directly influence the rotorcraft flight commands, the linear acceleration feedback is subtracted prior to the integrator 432 by providing path 443 into summation block 431. In this manner, angular-based command modes of the flight controller 400 utilize path 443 to balance the integrator 432 and the trim integrator 440 such that the total attitude reference remains unchanged. This enables a smooth transition from an angular-based command mode to a linear-based command mode and vice-versa. The linear acceleration feedback path of the flight controller 400 is active even in angular-based command modes, and is not active in linear-based command modes.

In the angular-based configuration of FIG. 6, the linear speed signal does not contribute to the linear acceleration feedback path, and the linear speed is set to be equal to the sensed linear speed. Accordingly, in some cases, the gain of the gain block 437B may be reparameterized to be at or near zero, and the linear acceleration feedback signal may be determined by the linear acceleration error. Further, because the trim attitude reference generated by the trim integrator 440 corresponds to zero acceleration, there is no trim speed error. When the rotorcraft is transitioned from an angular-based command mode to a linear-based command mode, the linear speed is initially set to the sensed speed, ensuring a smooth transition. Because path 443 subtracts the linear acceleration feedback signal prior to the integrator 432, path 443 may be deactivated without introducing step responses into the flight controller 400. In this manner, the rotorcraft may be instantly transitioned between angular-based and linear-based command modes at the pilot's command.

Turning to FIG. 7, a simplified schematic of an attitude command model 430 for an angular-based command mode is illustrated, in accordance with some embodiments. The attitude command model 430 corresponds to part of the flight controller 400 configuration of FIG. 6. As shown in FIG. 7, a delta attitude signal (e.g., the attitude reference signal) is generated by the integrator 432 and provided to the summation block 442. The delta attitude signal is also part of a linear acceleration feedback path comprising summation block 431, gain block 433, summation block 435A, and gain block 437A. The linear acceleration feedback signal is provided to the trim integrator 440 to generate a trim attitude reference, which is provided to the summation block 442. The linear acceleration feedback signal is also subtracted from the angular rate (e.g., the Euler rate) at summation block 431 via path 443. The summation block 442 sums the delta attitude and the trim attitude to generate a total attitude reference, and subtracts an attitude sensor signal to generate an attitude feedback signal.

In some embodiments, the RCAH command mode is implemented by the flight controller 400 based on an acceleration command. For example, in some embodiments, the rate command may be determined by Equation (3):

$$\dot{q}_{cmd} = X_b\, q_{max}\omega_{RC} - \frac{\dot{q}_{cmd}}{s}\omega_{RC}. \qquad (3)$$

In Equation (3), $\dot{q}_{cmd}$ represents a pitch acceleration command, $X_b$ represents a pilot longitudinal input, $q_{max}$ represents a maximum pitch rate command, and $\omega_{RC}$ represents a rate command bandwidth. The example rate command model described above (e.g., Equation (3)) is a pitch axis command model presented herein as an example, and other rate command models for pitch, roll, and/or yaw axes are possible. The rate command model described above allows the pitch acceleration to be limited, which can reduce rotorcraft loads and improve safety. The angular-based configuration of the flight controller 400 described herein allows for smooth transitions between an RCAH command mode and a linear-based command mode, such as LACVH or TRC.

The flight controller 400 of FIG. 4 may be configured for other angular-based command modes. For example, the various gain, blocks and paths of the flight controller 400 may be configured to generate appropriate angular acceleration commands for an Attitude Command/Attitude Hold ("ACAH") command mode, in some embodiments. In some embodiments, the ACAH command mode is implemented based on an acceleration command. For example, in some embodiments, the attitude command may be determined by Equation (4):

$$\dot{q}_{cmd} = X_b\theta_{max}\omega_{AC}^2 - \frac{\dot{q}_{cmd}}{s}\left(2\,\zeta_{AC} + \frac{\omega_{AC}}{s}\right)\omega_{AC}. \qquad (4)$$

In Equation (4), $\dot{q}_{cmd}$ represents a pitch acceleration command, $X_b$ represents a pilot longitudinal input, $\theta_{max}$ represents a maximum pitch attitude command, $\omega_{AC}$ represents the attitude command (e.g., translational acceleration) natural frequency, and $\zeta_{AC}$ represents a damping ratio. The example attitude command model described above (e.g., Equation (4)) is a pitch axis command model presented herein as an example, and other attitude command models for pitch, roll, and/or yaw axes are possible. The attitude command model described above allows the pitch acceleration to be limited, which can reduce rotorcraft loads and improve safety.

Figure 8:
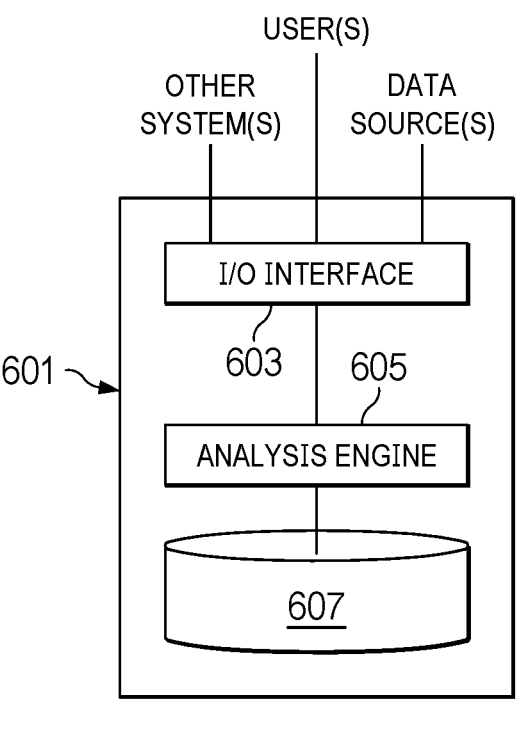
FIG. 8 illustrates a computer system, in accordance with some embodiments.

FIG. 8 illustrates a computer system 601. The computer system 601 can be configured for performing one or more functions with regard to the operation of the flight control system 201, flight control system 400, and flight controller 402, as described herein. Further, any processing and analysis can be partly or fully performed by the computer system 601. The computer system 601 can be partly or fully integrated with other aircraft computer systems or can be partly or fully removed from the rotorcraft.

The computer system 601 can include an input/output (I/O) interface 603, an analysis engine 605, and a database 607. Alternative embodiments can combine or distribute the I/O interface 603, the analysis engine 605, and the database 607, as desired. Embodiments of the computer system 601 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 603 can provide a communication link between external users, systems, and data sources and components of the computer system 601. The I/O interface 603 can be configured for allowing one or more users to input information to the computer system 601 via any known input device. Examples can include a keyboard, mouse, touch screen, and/or any other desired input device. The I/O interface 603 can be configured for allowing one or more users to receive information output from the computer system 601 via any known output device. Examples can include a display monitor, a printer, cockpit display, and/or any other desired output device. The I/O interface 603 can be configured for allowing other systems to communicate with the computer system 601. For example, the I/O interface 603 can allow one or more remote computer(s) to access information, input information, and/or remotely instruct the computer system 601 to perform one or more of the tasks described herein. The I/O interface 603 can be configured for allowing communication with one or more remote data sources. For example, the I/O interface 603 can allow one or more remote data source(s) to access information, input information, and/or remotely instruct the computer system 601 to perform one or more of the tasks described herein.

The database 607 provides persistent data storage for the computer system 601. Although the term "database" is primarily used, a memory or other suitable data storage arrangement may provide the functionality of the database 607. In alternative embodiments, the database 607 can be integral to or separate from the computer system 601 and can operate on one or more computers. The database 607 preferably provides non-volatile data storage for any information suitable to support the operation of the flight control system 201, flight control system 400, and flight controller 402, including various types of data discussed further herein. The analysis engine 605 can include various combinations of one or more processors, memories, and software components.

In accordance with an embodiment of the present disclosure, a method includes determining an angular rate of a rotorcraft based on a pilot input of the rotorcraft; determining an attitude reference for the rotorcraft based on the angular rate, the determining including: determining an attitude difference from a trim attitude of the rotorcraft; determining a linear acceleration error for the rotorcraft; determining a trim attitude of the rotorcraft, wherein the trim attitude is based on the linear acceleration error; and summing the attitude difference and the trim attitude to generate the attitude reference; determining a flight command for the rotorcraft based on the attitude reference; and controlling flight control elements of the rotorcraft based on the flight command. In an embodiment, the pilot input represents an angular rate command. In an embodiment, the method includes applying a gain to the linear acceleration error to generate a linear acceleration feedback signal, wherein determining the trim attitude includes integrating the linear acceleration feedback signal. In an embodiment, determining the attitude difference includes subtracting the linear acceleration feedback signal from an Euler rate of the rotorcraft and integrating the result. In an embodiment, determining the linear acceleration error includes applying a gain to the attitude difference to generate a linear acceleration reference and then subtracting a sensed linear acceleration of the rotorcraft from the linear acceleration reference. In an embodiment, the method includes equating a linear speed reference to a sensed linear speed of the rotorcraft. In an embodiment, the rotorcraft is in an angular-based command mode, and the method includes transitioning the rotorcraft to a linear-based command mode.

In accordance with an embodiment of the present disclosure, a method of operating a rotorcraft includes receiving a pilot input signal at a flight controller of the rotorcraft, wherein the pilot input signal represents a command to change an angular rate of the rotorcraft when the rotorcraft is in a first command mode, wherein the pilot input signal represents a command to change a linear rate of the rotorcraft when the rotorcraft is in a second command mode;

generating, by the flight controller, an angular rate signal based on the pilot input signal; generating, by the flight controller, a linear acceleration feedback signal based on the angular rate signal, wherein the linear acceleration feedback signal is subtracted from the angular rate signal when the rotorcraft is in the first command mode; generating, by the flight controller, an attitude feedback signal based on the angular rate signal and the linear acceleration feedback signal; generating, by the flight controller, an actuator command signal based on the attitude feedback signal, wherein the actuator command signal corresponds to the pilot input signal; and transmitting the actuator command signal to an actuator of the rotorcraft to control the flight of the rotorcraft. In an embodiment, the method includes, when the rotorcraft is in the first command mode, generating, by the flight controller, a linear speed signal based on a sensed linear speed signal; and when the rotorcraft is in the second command mode, generating, by the flight controller, a linear speed signal based on an integration of the linear acceleration signal, wherein the attitude reference signal is based on the linear acceleration signal. In an embodiment, the method includes generating, by the flight controller, a trim attitude signal based on the linear acceleration feedback signal. In an embodiment, the second command mode is a Translational Rate Command (TRC) mode. In an embodiment, the linear rate of the rotorcraft is a translational rate, wherein the angular rate signal is based on a pitch acceleration command corresponding to the translational rate. In an embodiment, the first command mode is a Rate Command/Attitude Hold (RCAH) mode. In an embodiment, the method includes transitioning the rotorcraft from the first command mode to the second command mode. In an embodiment, generating the attitude feedback signal includes integrating the linear acceleration feedback signal.

In accordance with an embodiment of the present disclosure, a flight control system for a rotorcraft includes a processor and a non-transitory computer-readable storage medium storing a program to be executed by the processor, the program including instructions to: operate the rotorcraft in an angular-based command mode, including: receiving a first pilot control signal representing an angular rate command for the rotorcraft; generating a first linear acceleration feedback signal based on the first pilot control signal; generating a first trim attitude signal based on the first linear acceleration feedback signal; and generating a first flight command for the rotorcraft based on the first pilot control signal and the first trim attitude signal; operate the rotorcraft in a linear-based command mode, including: receiving a second pilot control signal representing a linear command for the rotorcraft; generating a second linear acceleration feedback signal based on the second pilot control signal; generating a second trim attitude signal based on the second linear acceleration feedback signal; and generating a second flight command for the rotorcraft based on the second pilot control signal and the second trim attitude signal; and transition the rotorcraft between the angular-based command mode and the linear-based command mode. In an embodiment, operating the rotorcraft in the angular-based command mode includes generating an angular rate signal based on the first pilot control signal; subtracting the first linear acceleration feedback signal from the angular rate signal to generate an attitude signal; and adding the attitude signal to the first trim attitude signal to generate a total attitude reference signal. In an embodiment, the subtraction of the first linear acceleration feedback signal is initiated at a transition from the linear-based command mode to the angular-based command mode. In an embodiment, first trim attitude signal is generated continually while the rotorcraft is operated in the angular-based command mode. In an embodiment, the program further includes instructions to limit a magnitude of the first pilot control signal.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
determining an angular rate of a rotorcraft based on a pilot input of the rotorcraft;
determining an attitude reference for the rotorcraft based on the angular rate, the determining comprising:
determining an attitude difference from a trim attitude of the rotorcraft;
determining a linear acceleration error for the rotorcraft;
determining a trim attitude of the rotorcraft, wherein the trim attitude is based on the linear acceleration error; and
summing the attitude difference and the trim attitude to generate the attitude reference;
determining a flight command for the rotorcraft based on the attitude reference; and
controlling flight control elements of the rotorcraft based on the flight command.

2. The method of claim 1, wherein the pilot input represents an angular rate command.

3. The method of claim 1 further comprising applying a gain to the linear acceleration error to generate a linear acceleration feedback signal, wherein determining the trim attitude comprises integrating the linear acceleration feedback signal.

4. The method of claim 3, wherein determining the attitude difference comprises subtracting the linear acceleration feedback signal from an Euler rate of the rotorcraft and integrating the result.

5. The method of claim 1, wherein determining the linear acceleration error comprises applying a gain to the attitude difference to generate a linear acceleration reference and then subtracting a sensed linear acceleration of the rotorcraft from the linear acceleration reference.

6. The method of claim 1 further comprising equating a linear speed reference to a sensed linear speed of the rotorcraft.

7. The method of claim 1, wherein the rotorcraft is in an angular-based command mode, and further comprising transitioning the rotorcraft to a linear-based command mode.

8. A method of operating a rotorcraft, the method comprising:
receiving a pilot input signal at a flight controller of the rotorcraft, wherein the pilot input signal represents a command to change an angular rate of the rotorcraft when the rotorcraft is in a first command mode, wherein the pilot input signal represents a command to change a linear rate of the rotorcraft when the rotorcraft is in a second command mode;
generating, by the flight controller, an angular rate signal based on the pilot input signal;
generating, by the flight controller, a linear acceleration feedback signal based on the angular rate signal, wherein the linear acceleration feedback signal is subtracted from the angular rate signal when the rotorcraft is in the first command mode;
generating, by the flight controller, an attitude feedback signal based on the angular rate signal and the linear acceleration feedback signal;
generating, by the flight controller, an actuator command signal based on the attitude feedback signal, wherein the actuator command signal corresponds to the pilot input signal; and
transmitting the actuator command signal to an actuator of the rotorcraft to control the flight of the rotorcraft.

9. The method of claim 8 further comprising:
when the rotorcraft is in the first command mode, generating, by the flight controller, a linear speed signal based on a sensed linear speed signal; and
when the rotorcraft is in the second command mode, generating, by the flight controller, a linear speed signal based on an integration of the linear acceleration feedback signal, wherein the attitude reference signal is based on the linear acceleration feedback signal.

10. The method of claim 8 further comprising generating, by the flight controller, a trim attitude signal based on the linear acceleration feedback signal.

11. The method of claim 8, wherein the second command mode is a Translational Rate Command (TRC) mode.

12. The method of claim 11, wherein the linear rate of the rotorcraft is a translational rate, wherein the angular rate signal is based on a pitch acceleration command corresponding to the translational rate.

13. The method of claim 8, wherein the first command mode is a Rate Command/Attitude Hold (RCAH) mode.

14. The method of claim 8, further comprising transitioning the rotorcraft from the first command mode to the second command mode.

15. The method of claim 8, wherein generating the attitude feedback signal comprises integrating the linear acceleration feedback signal.

16. A flight control system for a rotorcraft comprising:
a processor and a non-transitory computer-readable storage medium storing a program to be executed by the processor, the program including instructions to:
operate the rotorcraft in an angular-based command mode, comprising:
receiving a first pilot control signal representing an angular rate command for the rotorcraft;
generating a first linear acceleration feedback signal based on the first pilot control signal;
generating a first trim attitude signal based on the first linear acceleration feedback signal; and
generating a first flight command for the rotorcraft based on the first pilot control signal and the first trim attitude signal;
operate the rotorcraft in a linear-based command mode, comprising:
receiving a second pilot control signal representing a linear command for the rotorcraft;
generating a second linear acceleration feedback signal based on the second pilot control signal;
generating a second trim attitude signal based on the second linear acceleration feedback signal; and
generating a second flight command for the rotorcraft based on the second pilot control signal and the second trim attitude signal; and
transition the rotorcraft between the angular-based command mode and the linear-based command mode.

17. The flight control system of claim 16, wherein operating the rotorcraft in the angular-based command mode further comprises:

generating an angular rate signal based on the first pilot control signal;

subtracting the first linear acceleration feedback signal from the angular rate signal to generate an attitude signal; and adding the attitude signal to the first trim attitude signal to generate a total attitude reference signal.

18. The flight control system of claim 17, wherein the subtraction of the first linear acceleration feedback signal is initiated at a transition from the linear-based command mode to the angular-based command mode.

19. The flight control system of claim 17, wherein the first trim attitude signal is generated continually while the rotorcraft is operated in the angular-based command mode.

20. The flight control system of claim 16, wherein the program further includes instructions to limit a magnitude of the first pilot control signal.

* * * * *